Jan. 31, 1967          F. A. BIGNELL ET AL          3,301,033
          APPARATUS FOR PRODUCING HEADED WIRE FORMS
Filed Aug. 14, 1964                              9 Sheets-Sheet 1

FIG. 1.

INVENTORS
FREDERICK A. BIGNELL
CEDRIC W. CROSBY
BY
Amster & Rothstein
ATTORNEYS Jan. 31, 1967　　　F. A. BIGNELL ET AL　　　3,301,033
APPARATUS FOR PRODUCING HEADED WIRE FORMS
Filed Aug. 14, 1964　　　　　　　　　　9 Sheets-Sheet 2

INVENTORS
FREDERICK A. BIGNELL
BY CEDRIC W. CROSBY
Amster & Rothstein
ATTORNEYS Jan. 31, 1967  F. A. BIGNELL ET AL  3,301,033
APPARATUS FOR PRODUCING HEADED WIRE FORMS
Filed Aug. 14, 1964  9 Sheets-Sheet 3

INVENTORS
FREDERICK A. BIGNELL
BY CEDRIC W. CROSBY

Amster & Rothstein
ATTORNEYS

Jan. 31, 1967   F. A. BIGNELL ET AL   3,301,033
APPARATUS FOR PRODUCING HEADED WIRE FORMS
Filed Aug. 14, 1964   9 Sheets-Sheet 5

INVENTORS
FREDERICK A. BIGNELL
CEDRIC W. CROSBY
BY
Amster & Rothstein
ATTORNEYS

INVENTORS
FREDERICK A. BIGNELL
BY CEDRIC W. CROSBY

Amster & Rothstein
ATTORNEYS

Jan. 31, 1967  F. A. BIGNELL ET AL  3,301,033
APPARATUS FOR PRODUCING HEADED WIRE FORMS
Filed Aug. 14, 1964  9 Sheets-Sheet 8

INVENTORS
FREDERICK A. BIGNELL
CEDRIC W. CROSBY
BY
Amster & Rothstein
ATTORNEYS

United States Patent Office 3,301,033
Patented Jan. 31, 1967

3,301,033
APPARATUS FOR PRODUCING HEADED
WIRE FORMS
Frederick A. Bignell, Emporium, and Cedric W. Crosby,
Austin, Pa., assignors to Emporium Specialties Co., Inc.,
Austin, Pa., a corporation of Pennsylvania
Filed Aug. 14, 1964, Ser. No. 389,659
14 Claims. (Cl. 72—294)

The present invention relates generally to an improved apparatus for producing headed wire forms, and more particularly to diverse mechanisms of said apparatus for continuously and efficiently producing said headed wire forms in uniform varied head configurations.

A general preliminary discussion of certain terms and relationships as used herein is believed helpful to a better understanding of the present invention. Throughout the description reference is made to a wire path, the starting point of which will be understood to be where the wire is introduced into the present apparatus, and the end point of which corresponds to the end of the wire. Considering this wire path as the main line of motion axis of the apparatus, movements of mechanisms along said path are referred to as axial and those transverse of said path are referred to as lateral. Moreover, the present apparatus includes two broad categories of mechanisms, namely a group first encountered along the wire path and performing diverse wire handling operations including successive wire feed or advancement along the wire path, and a wire heading mechanism located at the end of the wire path and heading the end of the successively fed wire.

Considered from a broad functional viewpoint, the uses of headed wire forms may generally be catagorized as mechanical and electrical. Commonplace examples of the former include pins or nails, while the latter includes electrical leads used in such products as capacitors, resisters and the like. Without intending a limitation on the scope of the present invention, the discussion following is related to the production of a headed wire form for electrical application, since by far this application is the more demanding as regards uniformity and construction of the headed wire form.

The demands on a headed wire form used in an electrical environment are particularly stringent as regards uniformity since variation in the size of the wire stem or in the mass and shape of the head will produce variation in the electrical characteristics of the electrical component in which the wire form is used. Moreover, the wire form is usually incorporated in such electrical component by having its head embedded in the component, and accordingly at the critical juncture of its head and stem the wire form must satisfy pull and torsion test specifications. Still further, the mass and shape of the head and surface markings thereon are critical to the holding power of the embedded connection of the wire form with the electrical component.

While wire heading apparatus is generally known and, by mechanisms and techniques of operation now employed, it is possible to produce headed wire forms meeting industrial specifications, the apparatus of the present invention as measured by the uniformity of its headed wire form production, the quality in construction of each wire form, and the latitude of head shapes and head surface markings of such production, represents a noteworthy advance in the art.

Broadly it is an object of the present invention to provide an improved wire heading apparatus having wire handling and wire heading mechanisms functioning in timed sequence with each other to produce headed wire forms having a variety of head configurations and surface markings. Specifically, it is an object to provide a wire heading mechanism for such apparatus having head forming die surfaces presented advantageously against a wire end and selectively imparted with rotational and axial movement at the same time or separately to mechanically work said wire end into a wide variety of head configurations.

Another object to provide in combination with such wire heading mechanism improved mechanism for handling the wire during feed thereto, including mechanisms providing controlled wire length feed, wire clamping, and wire cut-off, all in timed sequence with the wire heading operation and contributing to an over-all efficient and rapid repetitive cycle of operation for producing uniformly constructed headed wire forms.

More specifically, it is an object to provide an improved compact arrangement of such wire handling and heading mechanisms in relation to the wire path and to movement actuating means to achieve the operation of such mechanisms in timed sequence to each other and in accordance with a prescribed, rapid and repetitive cycle of operation.

Still another object is to provide wire handling and heading mechanisms having headed wire form producing movements accurately controlled in path, extent and occurrence, such that each repetitive production cycle is productive of uniform headed wire forms.

A preferred embodiment of a wire heading apparatus according to the present invention includes a compact arrangement of wire handling and wire heading mechanisms about a wire path and generally within an encircling arrangement of rotating shafts provided to actuate said mechanisms. Gear meshing engagement of the shafts for rotation in unison together with proper selection and indexing of cams mounted on said shafts from which the imparted movements are derived is effective to produce such movements in timed sequence according to a prescribed production cycle as herein described. Moreover, such imparted movements as is required for the production of headed wire forms according to the present invention is confined to simple lateral and axial thrusts which are provided uniformly in each repetitive production cycle and are accomplished in a single revolution of the power shafts.

The wire handling mechanisms include wire feeding, wire cutting and wire clamping mechanisms, located in this order along the wire path, and effective to successively feed a controlled length of wire to the wire heading mechanism which is located at the end of the wire path and which mechanically works the end of the wire into a head configuration integral to the remaining supply length of wire. Responsive to lateral movement imparted in timed sequence with the wire heading operation, the clamping mechanism is effective to secure the wire against movement during such heading operation and also, due to its location across the wire path, the clamping mechanism serves as a power stroke limiting stop surface for the wire heading mechanism. The cutting mechanism at the completion of the heading operation effects wire cut-off along the supply length of wire in a shearing action across the wire path to complete the production of a headed wire form. The wire feeding and wire heading mechanisms operate in reciprocating axial movements along the wire path, such movements of each being generally in the same direction and complimentary during a production cycle, wherein a wire feed thrust forward along the wire path is achieved by the feeding mechanism during retraction of the wire heading mechanism and conversely, during the power stroke of the wire heading mechanism into and about the additional length of fed wire the feeding mechanism is retracted back along the wire path into position for a succeeding feed thrust.

A preferred embodiment of a wire heading mechanism according to the present invention includes a pair of axially telescoped rams selectively imparted with rotation in unison and axial reciprocating movement independently of each other. A die block having a central through bore is mounted in an end of the outer ram and, during a power stroke of said ram, the die block is moved by the ram into engagement against the wire clamping mechanism. As a consequence of this movement of the outer ram, the through bore of the die block of said ram is closed about a wire end extending beyond the clamping mechanism. Thus, a wire end is encircled by the surface of the through bore which according to the present invention is effectively used as a head forming die surface in the mechanical working of said wire end into a head configuration integral to the supply length of wire. An additional head forming die surface acting against said wire end is provided on a plunger of the inner ram which extends into and operates within said through bore, and which is effective during a power stroke of said inner ram to crush the wire end upon itself in the production of a head integral to the supply length of wire. Provision is additionally made for integrating other tooling with the wire heading mechanism actuated both by and independently of such mechanism to produce head wire forms having a variety of head configurations and head surface markings.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein;

FIGS. 4–6 inclusive, are detailed partial plan views of operating mechanisms of the apparatus in their relative positions of movement during a typical sequence of operation in the production of a headed wire form, to wit;

FIGS. 9–11 inclusive, are partial sectional elevational views taken along appropriate sectional lines in FIG. 1 to best illustrate the constructional details of the actuating means imparting the movements to the FIG. 4 mechanisms to achieve the relative positions of such mechanisms as depicted in FIGS. 4–6, to wit;

FIGS. 12 and 13 are detailed plan and elevational views illustrating details of construction of the wire feeding mechanism, to wit;

FIGS. 14 and 15 are views similar to FIG. 12, but of a spring clamp of the wire feeding mechanism which functions to hold the wire during retracting movement of the feeder head to prevent inadvertant backward movement of the wire at this time, to wit;

FIGS. 17–20 inclusive, are views particularly directed to additional head forming tooling integrated with the wire heading mechanism of the present invention for producing another shape integral head, FIGS. 17, 18, 20 and 21 more particularly, being plan detailed views of the integrated assembly showing the positions of the operating members of said assembly in their relative positions of movement during a typical sequence of operation in the production of such headed wire form, to wit;

FIGS. 23–25 are views similar to FIGS. 17–20, but of still another assembly of head forming tooling integrated with the wire headed mechanism of the present invention for producing still another headed wire form, to wit:

FIG. 23 is an enlarged plan view of said assembly incident to a head forming operation;

FIG. 24 is a view similar to FIG. 23, in section, illustrating the relative positions of the parts of the assembly after movement of said assembly from the ready position of FIG. 23 into a working position about the wire and after the power stroke of the wire heading mechanism;

FIG. 25 is a view similar to FIG. 24 illustrating the relative position of the parts of the assembly incident to a power stroke of the tooling against a head formed on the wire for forging surface markings thereon; and, FIG. 26 is an enlarged isolated view of the serration headed wire form produced by the sequence of operations of FIG. 23–25.

Figure 1:
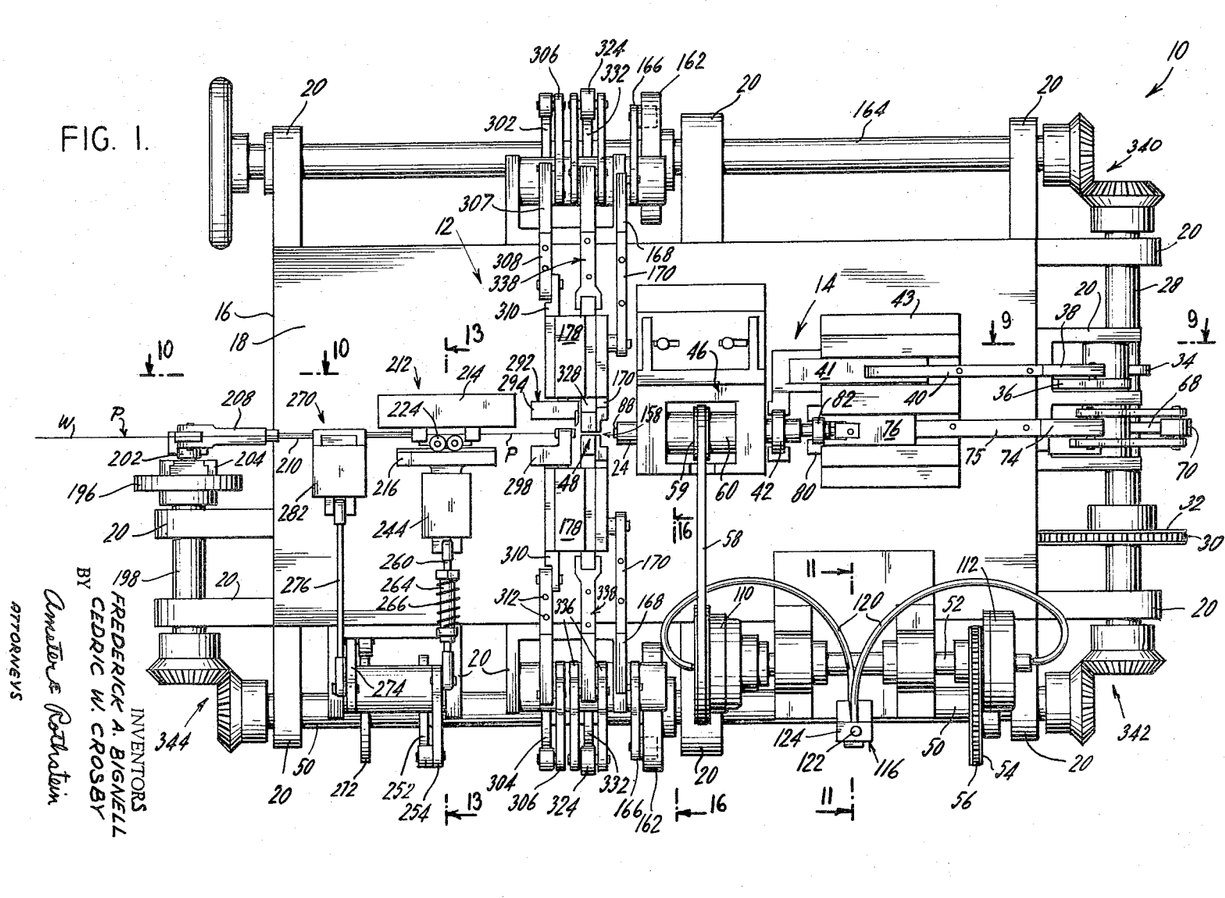
FIG. 1 is a plan view of a preferred embodiment of a wire heading apparatus according to the present inventions.
Figures 6, 7, 8, 9:
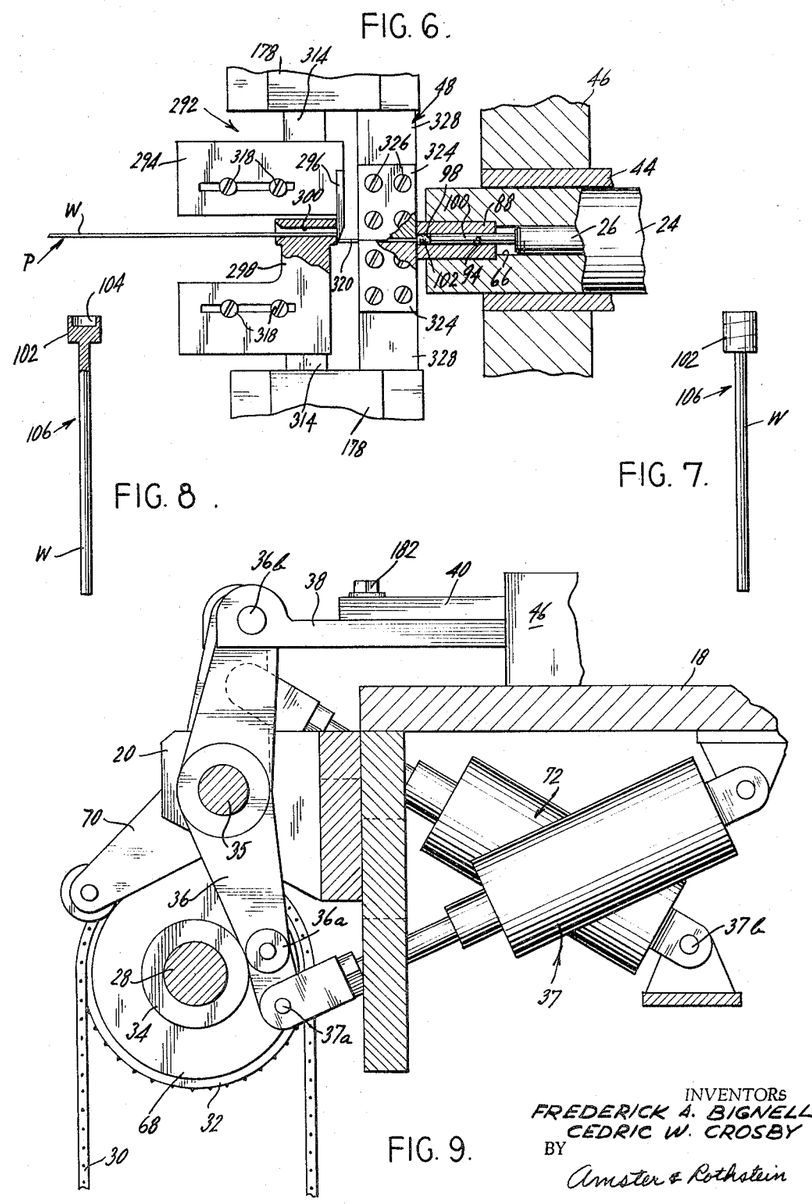
FIG. 6 shows the relationship of said FIG. 4 mechanisms after a head forming operation which produces an integral head on the supply length of wire from such projected wire length.
FIG. 7 is an isolated and an enlarged view of the headed wire form produced by the sequence of operations depicted in FIGS. 4–6.
FIG. 8 is a view similar to FIG. 7 with the head of the wire form in section to illustrate a typical depression formed in the end surface of the head during the production of said form.
FIG. 9 is a partial elevational view, in section taken along lines 9—9 of FIG. 1, illustrating cam actuating means for imparting axial movement to the operable members of the wire heading mechanism to move said members from the ready position of FIG. 4 into the working position of FIGS. 5 and 6.
Figure 22:
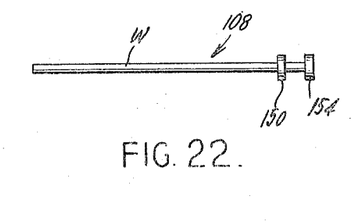
FIG. 22 is an enlarged isolated view of the double headed wire form produced by the sequence of operations depicted in FIGS. 17–20.
Figures 23, 24, 25, 26:
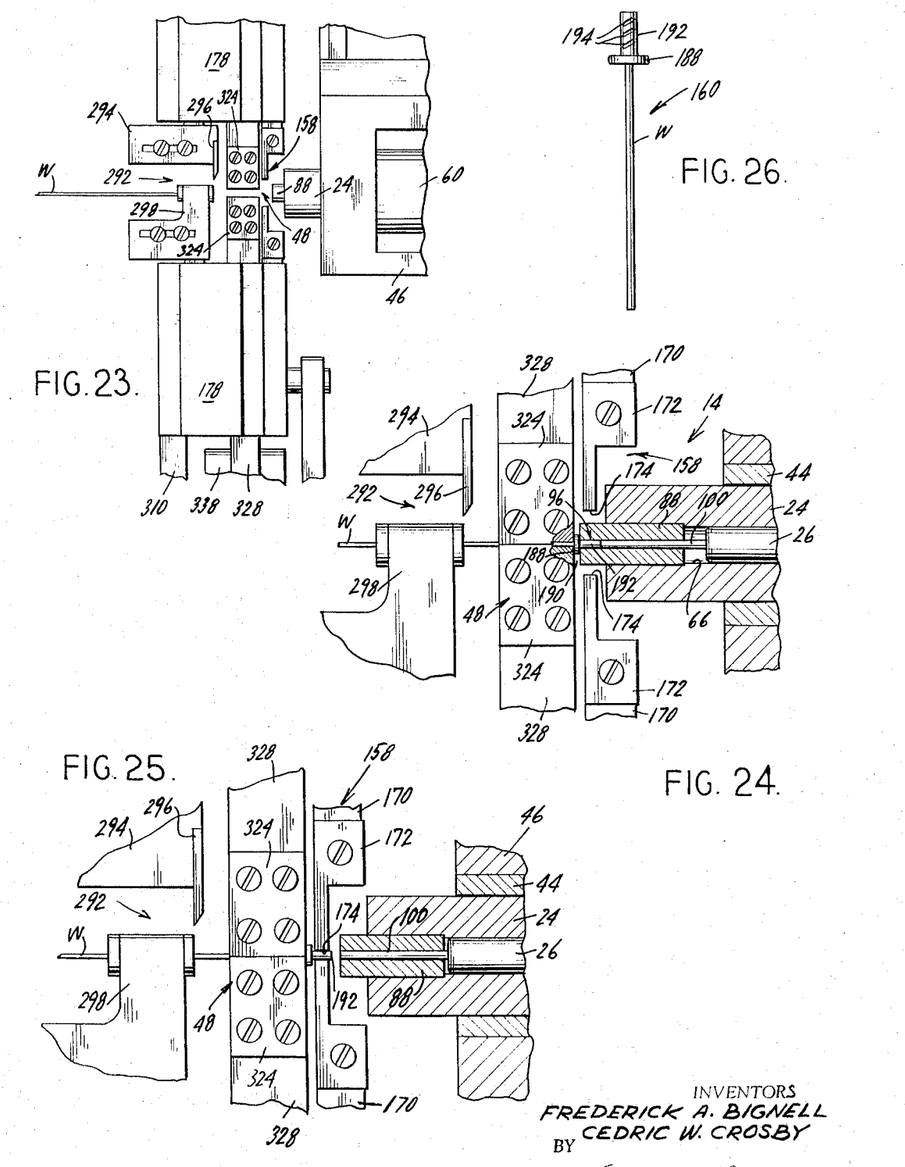

A preferred embodiment of a wire heading apparatus of the present invention is generally designated 10 in FIG. 1 and consists broadly of a group of wire handling mechanisms, collectively designated 12, which perform various operations for producing movement of a wire W along a prescribed path P to a wire heading mechanism generally designated 14, which is located at the end of the wire path P. As seen in FIG. 1, the mechanisms 12, 14 are compactly assembled on a main bench support 16, said mechanisms being located within the working area of the bench top 18, and rotating shafts imparting movement to such mechanisms being journalled in lateral extensions or supports, collectively designated 20, and spaced along the sides of the bench 16, In order of location along the wire path P, the wire handling mechanisms 12 include a wire feeding mechanism 212, a wire cutting mechanisms 292, and a wire clamping mechanism 48. As is hereinafter described in detail, the wire feeding mechanism is effective to feed successive lengths of the supply length of wire W disposed along the wire path P to the wire heading mechanism 14 in axial reciprocating movement along the wire path P. The wire cutting mechanism 292 is effective to cut the supply length of wire W in the production of individual headed wire forms in reciprocating lateral shearing movement across the wire path P. The wire clamping mechanism 48, located at the end of the wire path P is effective to secure the supply length of wire W against movement during the heading of the wire W by the wire heading mechanism 14, the movement of said wire clamping mechanism being lateral and closing on the supply length of wire W disposed along the wire path P. Cooperating with the wire handling mechanisms 12 is the wire heading mechanism 14 which alternates between a ready position spaced from the end of the wire W and a working position about the wire end, these positions being attained by axial reciprocating movement of this mechanism into and away from the end of the wire path P. In its working position about the end of the wire W, the wire heading mechanism 14 is effective to mechanically work the end of said wire into any one of a variety of head configurations such as are shown in FIGS. 7, 22 and 26.

Figure 2:
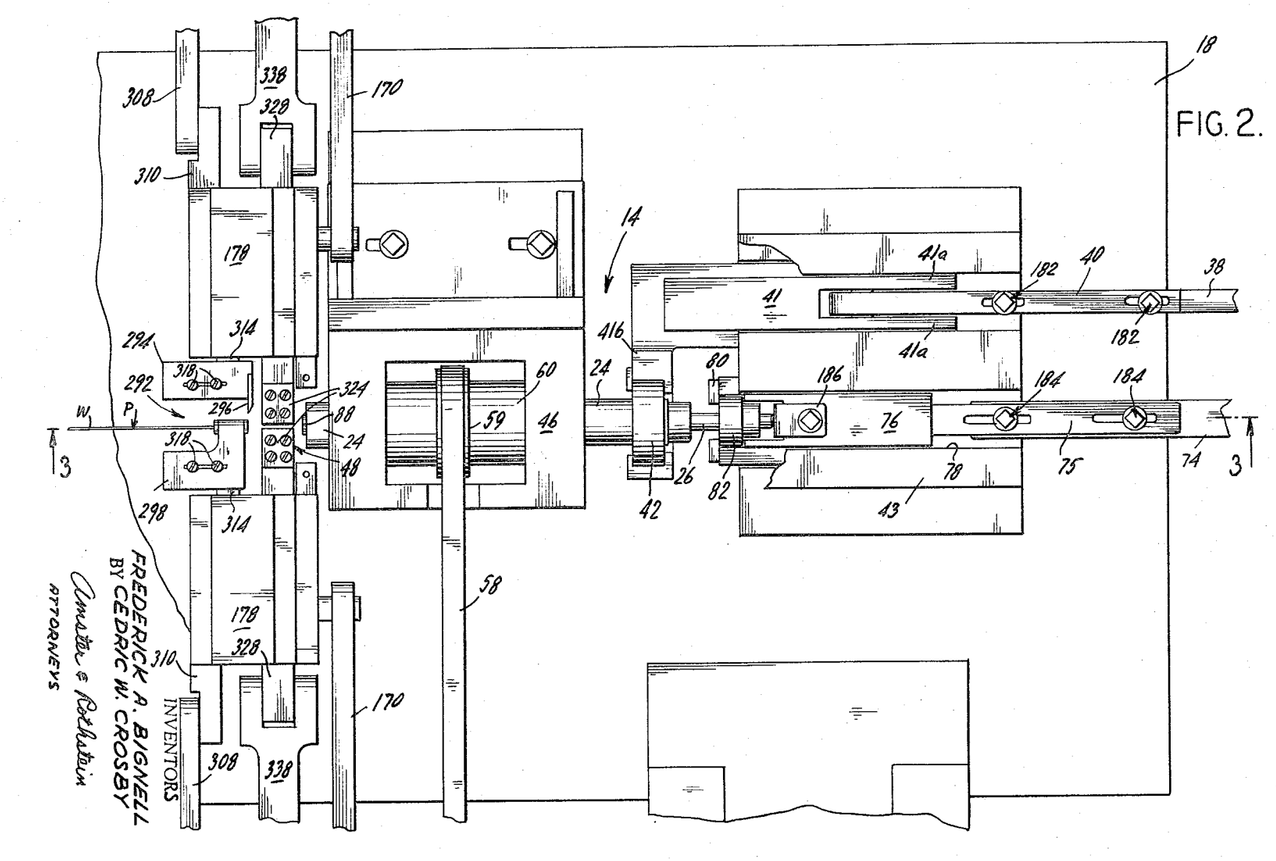
FIG. 2 is a fragmentary plan view, on an enlarged scale, of the wire heading mechanism of the apparatus of FIG. 1.
Figure 3:
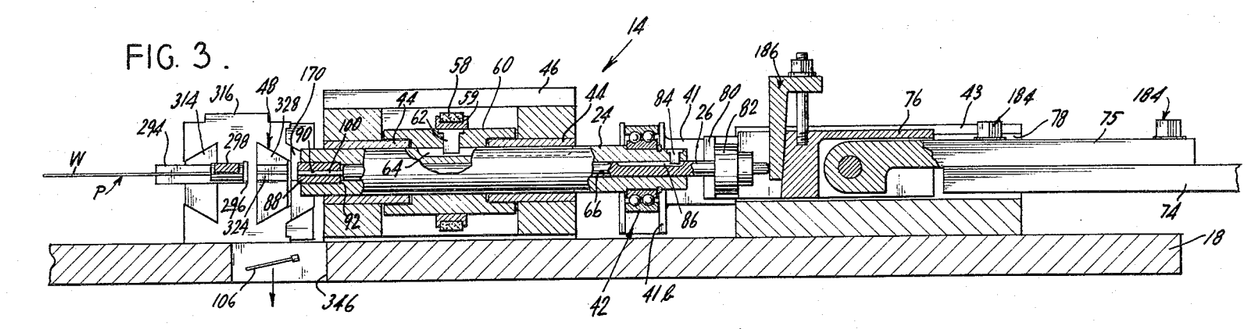
FIG. 3 is a elevational view, in section taken along line 3—3 of FIG. 2, illustrating the details of construction of such wire heading mechanism.

As best shown in FIG. 3, the wire heading mechanism 14 is comprised of axially telescoped outer and inner ramse, designated 24 and 26 respectively. Each of the rams 24, 26 is powered for independent axial reciprocating movement at the end of the wire path P and, additionally, the two rams are keyed to each other for rotation in unison during such axial reciprocating movement. Having particularly reference to FIG. 1, it will be seen that axial ram movement is derived from a cam shaft 28 powered by a main motor (not shown) through an endless chain drive 30 connected to a sprocket 32 rigidly secured on the cam shaft 28. As is best seen in FIG. 9, mounted on the cam shaft 28 is a cam 34 which will be understood to control axial movement of the outer ram 24. As is generally understood, cam 34 rocks a cam arm 36 pivotally mounted centrally as at 35 on one of the lateral supports 20 and presenting a cam follower 36a against the cam 34 under bias of an air cylinder device 37 connected between the end of the cam arm 36, as at 37a, and the underside of the table top 18, as at 37b. The upper end of cam arm 36 is connected by a pin 36b to bolted connecting rods 38, 40 for transmission of this rocking movement to the outer ram 24. More particularly, as is best shown in FIGS. 2 and 3, movement of cam arm 36 to the outer ram 24 can be traced through the bolted connecting rods 38, 40 to a block 41 slidably disposed in a support 43 on the table 18 and having bifurcated extensions 41a at one end connected to the rod 40 and at its other end an angular extension 41b which extends laterally into and about the axially disposed outer ram 24 and mounts a radial bearing 42 in which one end of the outer ram 24 is disposed. The use of an interconnected bolted pair of connecting rods, such as the rods 38, 40, and a connecting block, such as block 41, in the movement imparting linkage between a cam and a moving part under the control of said cam, such as has just been described as existing between the cam 34 and outer ram 24, is typical and illustrative of the movement imparting linkage employed throughout the construction of apparatus 10 of the present invention. Such movement imparting linkage offers the advantage of permitting adjustment in the position of a moving part actuated by the linkage merely by adjusting the bolt connection between the bolted connecting rods, and further permits accurately confining movement of said linkage to a prescribed path by slidably disposing the interposed connecting block in guide channels of a suitable support.

Proceeding now with the description of the outer ram 24, it is best seen from FIG. 3 that said ram is supported axially of the bench top 18 within a pair of spaced bearing sleeves 44 mounted in a support 46 on the bench top 18 such that the central axis of the outer ram 24 is in alignment with the wire W. Due to its position at the end of the wire path P, an axial movement of the outer ram 24 into the wire path P as occurs during a power stroke, is designed to bring the ram from a retracted ready position as shown in FIG. 3 into a working position against a wire clamping mechanism of the wire handling mechanisms 12, said wire clamping mechanism being generally designated 48 in FIG. 3 and better shown in FIG. 5 in a closed position on the wire W and extended across the end of the wire path P. During such a power stroke, the outer ram 24 may also be imparted with rotational movement about its central axis, which movement in conjunction with axial movement is of great advantage in the mechanical working of a wire end presented for head forming. Referring again to FIG. 1, such rotational movement is derived from a cam shaft 50 in bevelled gear meshing engagement with the cam shaft 28, cam shaft 50 in turn powering a drive shaft 52 through driving sprockets 54 and an endless driving chain 56. A pulley belt 58 trained about the drive shaft 52, and as best shown in FIG. 3 seated in a pulley 59 fixedly mounted about a sleeve 60 encircling the outer ram 24 and mounted for rotation on the sleeve bearings 44, is provided to transmit rotational movement to the outer ram 24, such motion transmission being effected through a key 62 fixedly mounted in the sleeve 60 and extending into a keyway 64 machined in the outer surface of the ram 24 so that simultaneously with rotation, the ram 24 can also be imparted with axial movement within the limits of the keyway 64.

Returning to the inner ram 26, it will be seen best from FIG. 3 that from a position within a central through bore 66 of the outer ram 24, said inner ram is adapted to be reciprocated axially independently of the outer ram 24 as well as rotated in unison therewith for the purposes of mechanically working a wire end presented for head forming. As best shown in FIG. 9, such axial movement is derived from another cam 68 on the cam shaft 28 rocking a pivotally mounted cam arm 70 similarly biased as is cam arm 36 by an air cylinder device 72 into cam engagement. As shown generally in FIG. 1 and in detail in FIG. 3, connection between the cam arm 70 and inner ram 26 is made through a pair of bolted connecting rods 74, 75 and a connecting block 76, the block 76 being disposed in a guide channel 78 of the support 43 in position to push the inner ram 26 during a power stroke and having end finger like extensions 80 engaged about a hub 82 formed on the end of the inner ram 24 for retracting said ram. Rotation of the outer and inner rams 24, 26 in unison is achieved by a key 84 fixedly mounted in an end of the outer ram 24 and extended into a keyway 86 machined in the outer surface of the inner ram 26, axial reciprocating movement of the inner ram being permitted within the limits of the keyway 86 simultaneously with rotation of the inner ram 26.

Having provided the rams 24, 26 with axial and rotational movement, as just described, these rams are further provided with head forming die surfaces for mechanically working a wire end into an integral head configuration. To this end, and as best shown in FIG. 3, a die block 88 having a central bore 90 is fixedly mounted in an end counter bore 92 in the outer ram central through bore 66, and presents by the surface of the bore 90 a head forming die surface, more particularly designated 94 in FIG. 5 which encircles a wire end 96 which is projected centrally into the bore 90 when the outer ram 24 is moved into its working position against the wire clamping mechanism 48 then closed about the wire W. Complimenting die surface 94 is a die surface 98 provided on an inner ram plunger extension 100 operating within the bore 90.

Figure 4:
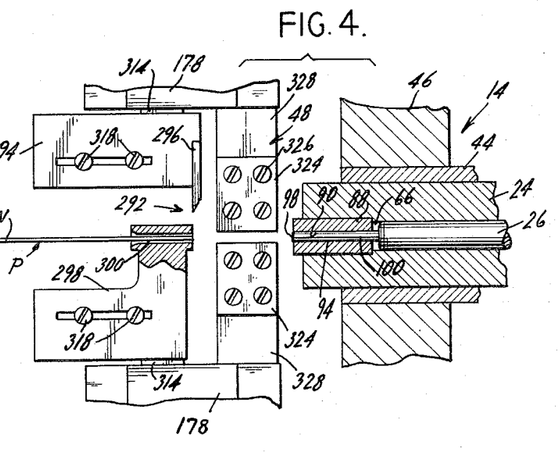
FIG. 4 shows the relative position of the wire cutting and clamping mechanisms and the operating members of the wire heading mechanism incident to a wire feed thrust.
Figure 5:
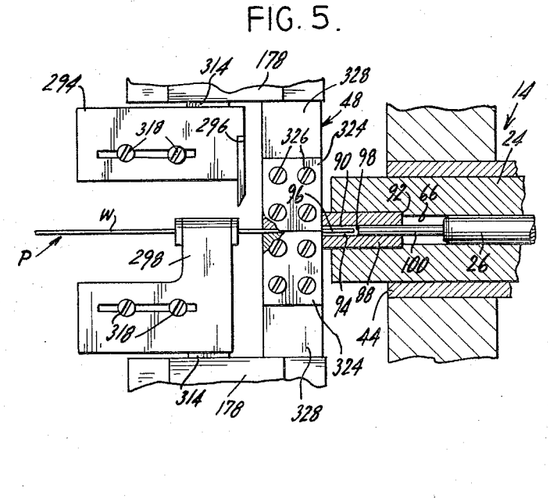
FIG. 5 shows the relationship of said FIG. 4 mechanisms following a wire feed thrust which projects a wire length to certain head forming die surfaces of the wire heading mechanisms then in position to engage with said wire end incident to a wire heading operation.

Having reference now to FIGS. 4, 5, and 6 which illustrate the relative positions of movement during a typical production cycle of the wire heading mechanism 14, it will be better understood how the head forming die surfaces 94, 98 mechanically work the wire end 96 into a head configuration integral to the supply length of wire W in the production of a wire form such as is shown in FIGS. 7 and 8. Assuming an advance of the wire W along the wire path P effected by the wire feeding mechanism 212, the end of the supply length of wire W is projected between and slightly beyond the open wire clamping mechanism 48 of FIG. 4. The wire clamping mechanism 48 is then closed about the wire W and the working positions of the parts of the wire heading mechanism 14 assumed relative to the wire W as depicted in FIG. 5. More particularly, the die block 88 of the outer ram 24 is moved into working position against the closed wire clamping mechanism 48 and a wire end 96 projected into the bore 90 as a consequence of this movement. Following this, a power stroke of the inner ram 26 against the wire end as depicted in FIG. 6 is effective to crush the wire end 96 upon itself causing the formation of a head 102 integral to the remaining supply length of wire W. During this cold mechanical working of the wire W uniformity in the formed head 102 is achieved by contact of the wire with the rotating encircling die surface 94, while in addition, rotation of the die surface 98 is effective to work a shaped depression 104 (see FIG. 8) in the head 102. A completed wire form 106, such as is illustrated in FIGS. 7 and 8, is then produced by severing the supply length of wire W at a prescribed point from the head 102 by a lateral shearing movement across the wire path P as is hereinafter described in detail.

Figures 10, 11:
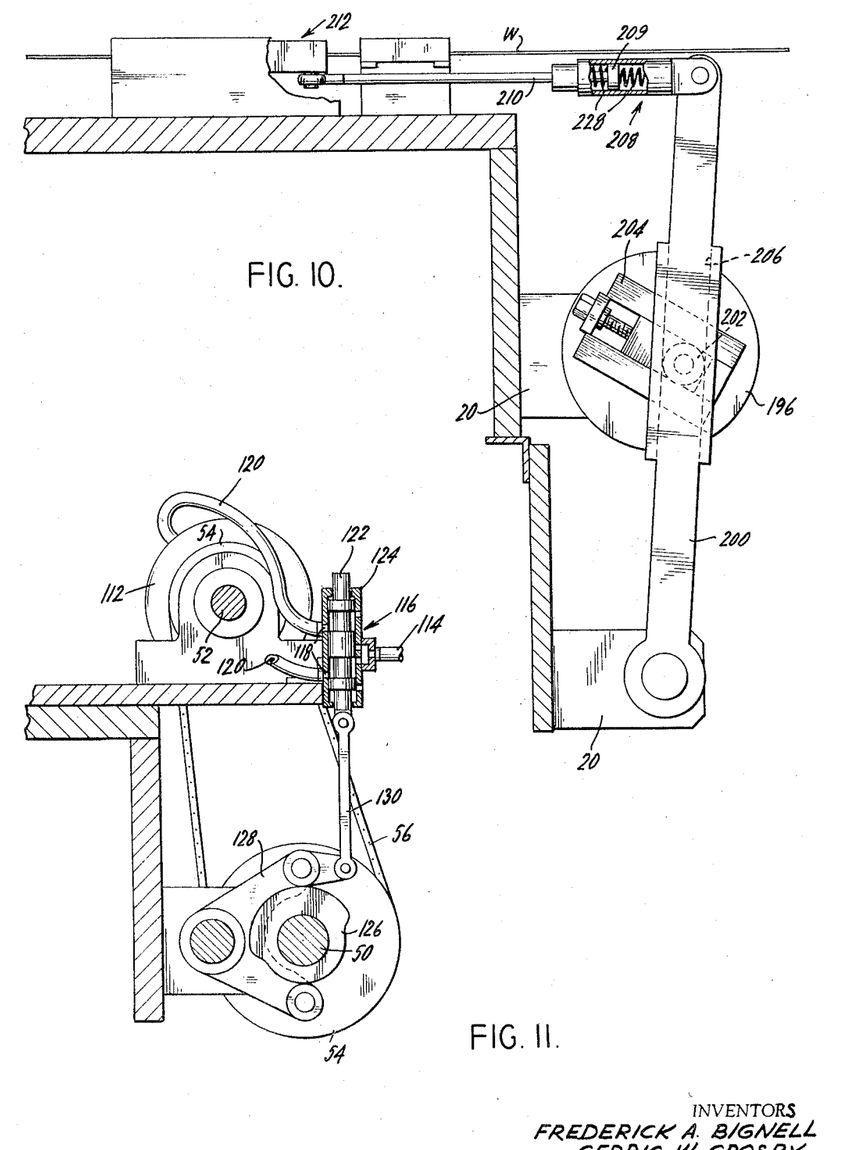
FIG. 10 is a partial elevational view, in section taken along lines 10—10 of FIG. 1, illustrating the eccentric actuating means for imparting axial thrust movement to the wire feeding mechanism which results in a wire end being presented to the wire heading mechanism for mechanical working.
FIG. 11 is a partial elevational view, in section taken along lines 11—11 of FIG. 1, illustrating the valve connection to the apparatus through which pressure air is diverted to power the operable members of the wire heading mechanism for selective rotation during a wire heading operation.

Contemplated within the scope of the present invention is the integration of additional tooling to the wire heading mechanism 14, as just described, the operation of which in cooperation with the die surfaces 94 and 98 is effective to produce integral heads of other configurations, such as for example the double headed wire form 108 best illustrated in FIG. 22. Such head configurations do not require rotation in the die surfaces 94, 98 and accordingly this movement of the rams 24, 26 is dispensed with. As best seen in FIGS. 1 and 11, mounted on opposite sides of the drive shaft 52 which operates the pulley belt 58 imparting rotational movement to the rams 24, 26 is a brake 110 and clutch 112 respectively, only one of which is operative at any point in time. That is, ram rotation is permitted when the clutch 112 makes a driving engagement between the driving sprocket 54 and drive shaft 52 during which time the brake 110 is inoperative, and conversely there is no ram rotation when the brake 110 is operative and the clutch 112 is disengaged. Selective operation of these mechanisms is under the control of pressure air delivered from a suitable source (not shown) through a hose 114 connected to an air valve 116 which operates in a conventional manner to uncover ports 118 for selective pressure air admission through additional hoses 120 to either the brake 110 or clutch 112. Movement of a valve slide 122 within the valve casing 124 uncovers the ports 118 for selective operation of the clutch 112 and brake 110 and is in turn controlled by a cam 126 on the cam shaft 50 connected to reciprocate the valve slide through a rocking cam arm 128 and connecting link 130. Thus to dispense entirely with ram rotation it is necessary only to select a cam (not shown) maintaining a constant position of the valve slide 122 which directs pressure air to the brake 110. However, cam 126 as shown in FIG. 11 will reciprocate the valve slide 122 to provide cyclic alternating selective pressure air admission between the clutch 112 and brake 110, as is desirable in the production of the wire form 106, wherein ram rotation is dispensed with during the ram retraction portion of the production cycle prescribed for this wire form.

Figures 16, 17, 18:
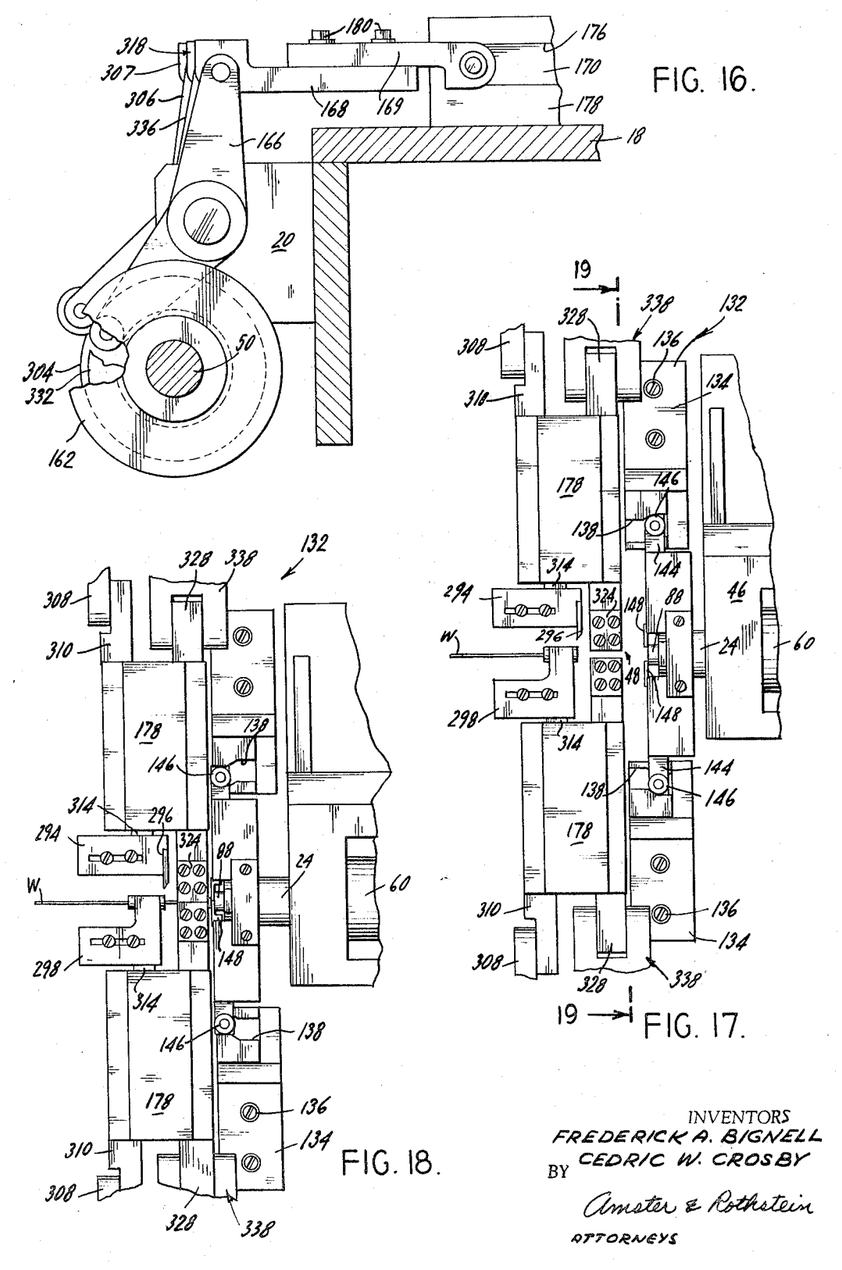
FIG. 16 is a partial elevational view, in section taken along line 16—16 of FIG. 1, of a bank of cam actuating means employed to impart reciprocating lateral movement and is illustrative generally of the actuating means provided the mechanisms of the present apparatus which during the production cycle alternate between engagement and disengagement with the wire.
FIG. 17 is a partial plan view of the assembly of the head forming tooling and wire heading mechanism in a position incident to a head forming operation and best illustrating the cam arrangement of said tooling actuated by axial movement of the wire heading mechanism.
FIG. 18 is a view similar to FIG. 17 illustrating the relative positions of the parts of the said assembly after movement into position about a projected wire end.
Figure 19:
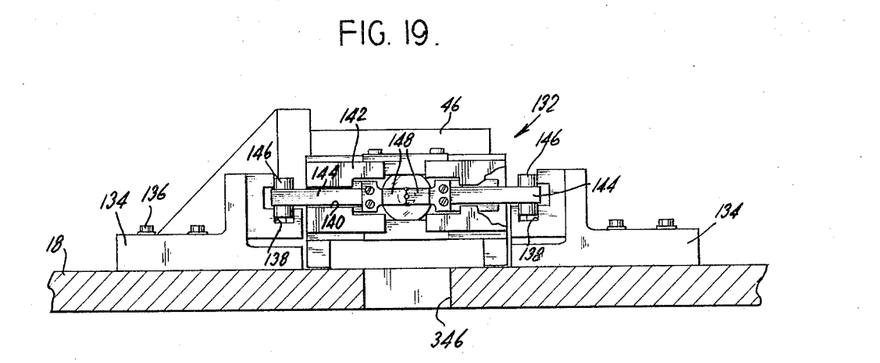
FIG. 19 is a front view of said assembly showing the tooling closed about the wire end incident to a power stroke of the wire heading mechanism.
Figure 20:
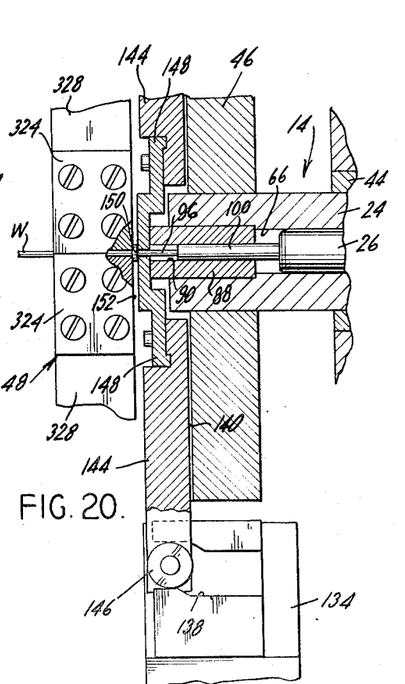
FIG. 20 is an enlarged partial plan view, partly broken away, of said assembly during the initial portion of the power stroke of the wire heading mechanism and illustrating the forming out of the wire into a first head configuration along the supply length of the wire.
Figure 21:
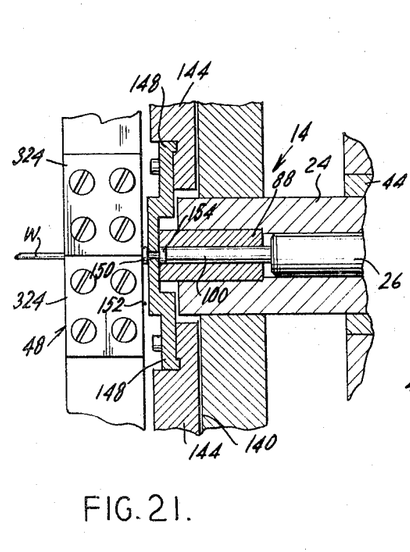
FIG. 21 is a view similar to FIG. 20, illustrating completion of the power stroke of the wire heading mechanism and the formation of a second head configuration on the wire.

Continuing now with a description of the additional tooling integrated with the wire heading mechanism 14, such tooling generally designated 132 in FIG. 17 includes identical supports 134 mounted as by bolts 136 to the bench top 18 on opposite sides of the movable rams 24, 26 and presenting cam grooves 138 running generally parallel to the axial path of said rams. As shown in FIG. 19, disposed within guide channels 140 formed in blocks 142 bolted on the end of the outer ram 24 are a pair of arms 144 which each have on one end a cam follower 146 riding in a cam groove 138 and on the other end a wire clamping bracket 148, the pair of brackets 148 when actuated being accurately controlled in lateral movement by the guide channels 140 to close on the wire W in alignment with each other and at a point of contact on the wire W forward of the die block 88 of the outer ram 24. Such lateral movement occurs during a power stroke of the outer ram 24 during which said ram is moved axially into the wire path P and such ram axial movement forces the cam followers 146 along the cam grooves 138 resulting in opposing lateral movement of the arms 144 and the closing of the brackets 148 on the wire W as depicted in FIG. 20. At this point in time the power stroke of the inner ram 26 is commenced during which axial movement of the ram plunger 100 in the bore 90 is against the wire end 96 and causes the wire to form out in a first head 150 in the clearance space 152 between the clamping mechanism 48 and the brackets 148 as is clearly illustrated in FIG. 20. Continued movement of the plunger 100 within the bore 90 as is contemplated in a complete inner ram power stroke is effective to produce thickening of the wire end 96 within said bore and a second formed head 154 as is shown in FIG. 21, the resulting product when severed from the supply length of wire W being the double-headed wire form 108 illustrated in FIG. 22.

In addition to tooling 132 as just described powered by the wire heading mechanism 14, the present invention also contemplates tooling, generally designated 158 in FIG. 23, which is independently powered under an adequate force to forge surface markings in the formed wire head, as in the production of a serration headed wire form 160 shown in FIG. 26. As best shown in FIGS. 1 and 16, actuating such tooling are identical positive motion cams 162 mounted on the opposite cam shafts 50 and 164 and each imparting rocking movement to pivotally mounted cam arms 166 which through bolted connecting rods 168, 169 and a connecting block 170 impart lateral movement to die blocks 172 for closing said blocks on the wire W as depicted in FIG. 25. To assure precise alignment of die surfaces 174 provided on the confronting faces of the die blocks 172 and contact of said die surfaces at a precise location on the formed wire head, each connecting block 170, as best shown in FIG. 16, is accurately controlled in lateral movement within a guide channel 176 in a support 178. Additionally by adjustment in the bolt connection 180 of the connecting rods 168, 169 it is possible to control the depth of penetration of the die surfaces 174 into the formed wire head.

The cycle of operation of the wire heading mechanism 14 and tooling 158 is commenced by axial movement of the rams 24, 26 into the working position depicted in FIG. 24, which it will be noted places the outer ram die block 88 short of the then closed wire clamping mechanism 48. Adjustment in the power stroke of the outer ram 24 is achieved by appropriate adjustment in the bolt connection 182 of the connecting rods 38, 40 of said ram (see FIG. 2), and in the power stroke of the inner ram 26 adjustment to a corresponding degree in the bolt connection 184 of the connecting rods 74, 75 as well as fine adjustment, if required, in the stroke adjusting block arrangement 186 (see FIG. 3) on the inner ram connecting block 76. Adjustment in the length of the power strokes of the rams 24, 26 as just described, is made of course not only preparatory to the production of serration headed wire forms 160, but also as required in the production of other headed wire forms. Returning to FIG. 24, it will be noted that the power stroke of the ram plunger 100 is effective to cause the wire end 96 both to form out in a head 188 in the clearance 190 between the clamping mechanism 48 and die block 88 and also to increase in diameter along its terminal length 192. According to the prescribed cycle of operation, the rams 24, 26 are then retracted and, in the manner just described and best depicted in FIG. 25, the serration die surfaces 174 are closed upon the thickened wire length 192 and are effective to forge surface markings therein. Wire cut-off at a point along the supply length of wire completes production of a serration headed wire form 160 having surface serrations 194 as shown in FIG. 26.

By way of summary, the foregoing description was explanatory of the construction of a preferred embodiment of a wire heading mechanism 14 according to the present invention, and specifically detailed the operation of this mechanism as well as that of the additional head-forming tooling 132 and 158 attachments actuated both by and independently of the heading mechanism, by which wire forms having a variety of head configurations are produced, as for example the illustrated wire forms 106, 108 and 160 of FIGS. 7, 22 and 26 respectively. The foregoing description assumed successive feed of the wire W to the heading mechanism 14, which according to the present invention, is achieved by the mechanisms collectively designated 12 and which include a wire feeding, wire cutting and wire clamping mechanisms, now to be described in detail in the order just named.

Figure 12:
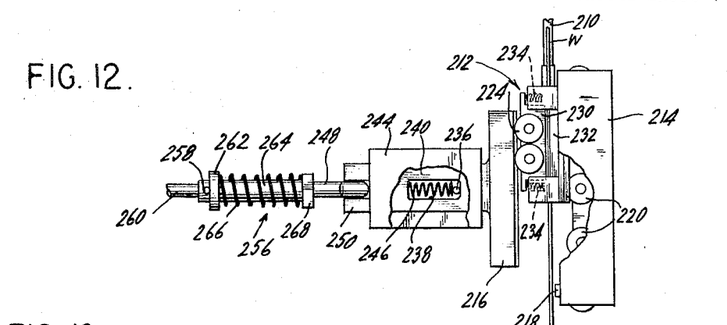
FIG. 12 is a partial plan view, partially broken away, of the feeder head of said wire feeding mechanism which best illustrates the guide control exerted on the head by spaced guide members confining the same to the wire feed path and also a stop control for limiting thrust movement of the head along the wire path to a prescribed distance for effecting wire length control during feeding thrust.
Figures 13, 14, 15:
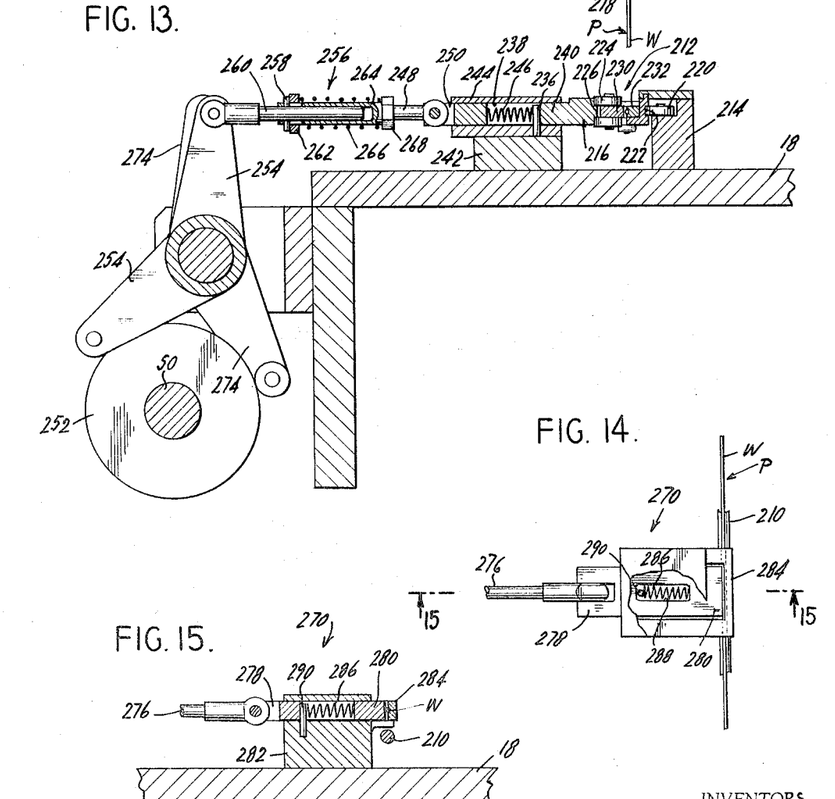
FIG. 13 is a partial elevational view, in section taken along lines 13—13 of FIG. 1, further illustrating details of construction of actuating means imparting lateral movement to wire engaging jaws of said feeder head for closing about the wire incident to a feeding thrust movement.
FIG. 14 is a partial plan view, partly broken away, illustrating the position of said spring clamp along the wire path and the spring of said clamp normally biasing the same into wire engagement during retraction of the feeder head along the wire path.
FIG. 15 is a partial elevational view, in section taken along lines 15—15 of FIG. 14, showing the connection of the spring clamp to an actuating rod for opening of the same incident to a wire feed thrust movement of the feeder head.

In essence, wire feed is achieved with a mechanism including opposing clamping jaws which close on the wire W and are then thrust forward for a prescribed length along a path confined to the wire path P, which is effective to present a precise wire length to the wire heading mechanism 14 for mechanical working. At the end of this forward thrust the jaws are disengaged from the wire and retracted into a ready position for successive cyclic feeding thrust movements. Because of the length of travel required for a wire feeding thrust, such movement as shown in FIG. 1 is placed under the control of an eccentric 196 mounted on an eccentric shaft 198 which is powered by bevelled gear meshing engagement with the auxiliary cam shaft 50. As best shown in FIG. 10, an eccentric arm 200 pivotally connected at one end to a lateral bench support 20 and connected to said eccentric through an eccentric pin 202 mounted in eccentric blocks 204 and disposed in a guide groove 206 of said arm is connected through an over-thrust control 208 and connecting rod 210 to a feeder head 212. Responsive to rotation of the eccentric 196, and as best shown in FIGS. 12 and 13, the feeder head 212 is reciprocated axially along the wire path P between a fixed guide block 214 and a movable guide block 216, the forward point of axial thrust along the wire path P being fixed by engagement of the feeder head 212 with a stop 218 on the fixed guide block 214. Provided as both a control confining the feeder head 212 precisely to the wire path P and also to permit free movement of said feeder head between the blocks 214, 216, spaced rollers 220 mounted on the block 214 are disposed in guide grooves 222 in one side of the head 212 while spaced pairs of rollers 224 mounted on the opposite side of the head straddle a guide surface 226 machined in a confronting face of the movable guide block 216. Consistent with the function of the feeder head 212 to feed a precise length of wire to the wire heading mechanism 14, as has just been noted the end point of the forward axial thrust is set by contact of the feeder head 212 with the stop 218 which may or may not precisely coincide with the throw of the eccentric 196. Accordingly, and as best shown in FIG. 10, movement of the eccentric arm 200 is transmitted first to the overthrust control 208 in which a collar 209 on the end of the feeder head connecting rod 210 is suspended between opposing springs 228 adapted to take up any discrepancy in imparted thrust and desired wire length feed.

Returning again to FIGS. 12, 13, it will be seen that the feeder head 212 is comprised of an outer jaw 230 and an inner jaw 232 normally biased out of engagement with the wire W by interposed springs 234, the limit of disengagement however, being fixed by a pin stop 236 disposed in a slot 238 in an extension 240 of the movable guide 216 which is in surface contact with the outer jaw 230. Pin stop 236 is anchored in a block support 242 mounting a bearing sleeve 244 which accommodates the movable guide block extension 240. Also disposed in the slot 238 is a spring 246 which cushions closing movement of the outer jaw 230 against the inner jaw 232 when such movement is transmitted to said outer jaw by lateral movement of the guide block 216.

Such lateral movement of the guide 216 is imparted by a cam actuated rod 248 connected to bifurcated extensions 250 on the guide extension 240, and is initiated to ease the outer jaw 230 into closing movement on the wire W against the inner jaw 232 against the opposition of the interposed springs 234 preparatory to a forward feed thrust of the feeder head 212. As best seen in FIG. 13, the cam controlling this movement designated 252 is mounted on cam shaft 50 and imparts rocking movement to a cam arm 254 connected through an over-thrust control 256 to the rod 248. Thus, a smooth closing movement of the outer jaw 230 on the wire W is assured by transmission of the movement first through a pin 258 mounted on a cam arm rod 260 bearing against a collar 262 slidably disposed on a cylinder extension 264 of the rod 248, and compressing a heavy duty spring 266 which seated against a fixed collar 268 propels the rod 248 in lateral movement.

As best shown in FIGS. 14 and 15, operating in timed sequence with thrust and retraction movement of the feeder head 212 is a spring actuated clamp 270, normally biased closed on the wire W during retraction of the feeder head 212 to prevent inadvertant wire movement by the feeder head at this time, and cam actuated out of wire engagement during wire feeding thrust movement. Returning to FIG 1, it will be seen that disengaging clamp movement in timed sequence is achieved by a cam 272 on cam shaft 50 connected through a rocking cam arm 274 (see also FIG. 13) to a rod 276 shown in FIGS. 14, 15 to be connected to bifurcated extensions 278 of a movable clamping jaw 280 of said spring clamp 270. Formed as an axial extension on the clamp support 282 is a fixed clamping jaw 284 against which the jaw 280 is normally biased closed on the wire W by a spring 286 disposed in a slot 288 and anchored against a lateral closing movement limiting stop pin 290 mounted in the body of the clamp support 282.

As shown in FIG. 1 next encountered along the wire path P after the feeder head 212 is a wire cutting mechanism 292 which effects wire cutoff along the supply length of wire. This mechanism as shown in detail in FIG. 6 is a two-part device consisting of a knife support 294 and knife 296 and a wire guiding member 298 having a wire receiving central bore 300 directing the wire W to the wire heading mechanism 14. Returning to FIG. 1, it will be seen that the wire cutting mechanism 292 is actuated by power derived from the oppositely spaced auxiliary cam shafts 50, 164 operating cams 302, 304, which each rock a cam arm 306 (see also FIG. 16) in turn connected through a bolted arrangement of connecting rods 307, 308 and a block 310 to the knife support 294 and guiding member 298 respectively. As previously explained, the bolt connection 312 of each of said connecting rod pairs 307, 308 is provided to allow for adjustment in lateral stroke of said knife support and guide member, while as shown in FIG. 17 the blocks 310 actually mount actuating arms 314 for the knife support 294 and guide member 298 respectively, each of the blocks 310 being accurately controlled in lateral movement within guide channels (not shown in FIG. 17) in the support 178 to maintain proper alignment of the knife 296 carried by support 294 with the guide member 298. As best seen in FIG. 6, such alignment of these parts is first fixed by adjustment of the actuating arm bolted mounting connections 318 and is such as to cause a clean shear of the wire W at the knife contact point thereon upon lateral movement of the guide member 298 across the wire path P. That is, wire cut-off is achieved by movement of the knife 296 up to the wire path P and movement of the guide member 298 actually across said path so that the end 320 of the stem of the produced headed wire form is not bent.

As distinguished from the spring actuated wire clamp 270, previously described, also included among the group of wire handling mechanisms 12 is a positive cam actuated wire clamp 48 disposed next along the wire path P after the wire cutting mechanism 292. As may be seen in FIG. 6, apart from the obvious function of clamping the wire W against movement during a wire heading operation, the location of clamp 48 at the end of the wire path P gives it the added function of a stroke limiting stop for axial movement of the outer ram 24 of the heading mechanism 14. As such, the identical jaws 324 of this clamp which close upon the wire W preparatory to a wire heading operation are securely mounted, as shown in FIG. 6, by plural screws 326 to a pair of opposing arms 328 accurately controlled in lateral movement by guide channels provided in the support 178 also mounting the actuating arms 314 of the previously described wire cutting mechanism 292. As best seen in FIG. 1, an identical cam 332 mounted on each of the cam shafts 50, 164 imparts movement to each arm 328 through a rocking cam arm 324 (see also FIG. 16) each having a bifurcated extension 336 connected through a bolted double connecting rod arrangement 338 (for stroke adjustment as previously explained) to each of the arms 328.

Since closing movement of the wire clamp 48 is related to two other movements in the operation of the wire heading apparatus 10, namely the feed thrust of the feeder head 212 and the power strokes of the rams 24, 26 this is believed to be a convenient point in the description for an explanation of how these and other described movements are achieved in timed sequence. As seen in FIG. 1, such movements are powered by the shafts 28, 50, 164 and 198 rotating in unison by virtue of the bevelled gear meshing engagement therebetween as at 340, 342, and 344. The present apparatus will be understood to be designed to produce a wire form each complete revolution of the shafts, said shafts being normally operated at 300 r.p.m. producing 18,000 of such wire forms an hour. Using the end of the feed thrust movement of the feeder head 212 to signal the end of a complete cycle, succeeding cycles and the timed sequence of main movements occurring within each cycle occur in the following order in point of time. First there is retraction of the feeder head 212 simultaneously with commencement of the power stroke of the wire heading mechanism 14 in and about the projected wire end then clamped securely in the clamping device 48. Accordingly, the eccentric 196 controlling movement of the feeder head 212 is indexed to the start of the retraction stroke of said head while the cams 34, 68 controlling movement of the rams 24, 26 respectively, are indexed to the start of the power stroke of said rams. It is assumed of course that these cams as well as the other actuating cams described herein are provided with an appropriate profile to provide the movements desired. As the present apparatus is designed, prior to completion of the retraction stroke of the feeder head 212 the wire heading operation as performed by the die surfaces 94, 98 of the rams 24, 26 is first completed requiring wire cut-off next in time by the wire cutting mechanism 292.

The cams 302, 304 controlling movement of this mechanism are accordingly indexed to the cycle of operation to achieve such wire cut-off even before withdrawal of the rams 24, 26 from about the produced headed wire form 106 as shown in FIG. 6. Next in time, the actuating cams 332 of the clamp 48 are indexed to disengage the jaws 324 of said clamp from about the headed wire form 106 permitting the same to feed by gravity through the bench opening 346 as best seen in FIG. 3. Simultaneously with such disengagement from the wire form by the clamp 48 and the withdrawal thereof to its ready position for the next cycle of operation, the wire heading mechanism 14 and wire cutting mechanism 292 are each also withdrawn to a next cycle ready position, such as shown for example in FIG. 4. This opens the end of the wire path P for a thrust of another length of wire W through the guide member 298 by the feeder head 212 which occurs when the feeder head 212 reverses its direction along the wire path P responsive to rotation of its controlling eccentric 196 180 degrees from the assumed starting point of the cycle. It is at this point in time that the cam 252 controlling lateral movement of the movable guide 216 is indexed to cause this guide to close the normally biased-open jaws 230, 232 of the feeder head 212 into contact with the wire W, and conversely that the cam 272 controlling the associated spring clamp 270 normally biased-closed on the wire W is indexed to open this clamp. Upon completion of these movements, forward thrust of the feeder head 212 along the wire path P is effective to feed another wire length to the wire heading mechanism 14. The length of wire travel during the initial phase of this feed movement is sufficient for the wire W to clear the open jaws 324 of the wire clamping mechanism 48 which thereafter are actuated to close upon the wire W, and which jaws when in a closed position about the wire W present an axial movement limiting surface for the die block 88 of the outer ram 24 during the wire heading operation producing the spun head wire form 106, as is best shown in FIG. 5. The power stroke of the outer ram 24 bringing the die block 88 against the clamp 48 may be initiated slightly before the end of the feed movement of the wire W so long as surface contact therebetween occurs after the clamp 48 closes upon the wire end 96. Moreover, by proper selection of the cams 332 actuating the clamp 48 such closing movement is made to coincide with contact of the feeder head 212 against the stop 218, or to be on the safe side instantaneously after such contact to insure that the wire length fixed by such contact is not altered by premature closing contact of the clamp 48 on the wire W.

From the foregoing description of a complete cycle of operation of the wire heading apparatus 10 of the present invention, it will be appreciated that the movements of the various mechanisms thereof are made to occur in proper timed sequence by proper cam selection and the indexing of said cams to produce such movements in point of time according to the sequence described. It further will be appreciated that the over-all apparatus design incorporates in a novel manner various control mechanisms, all as herein described, to insure the production in repetitive cycles by said apparatus of headed wire forms characterized by uniformity as well as by a wide latitude of variation in head configurations produced on said wire forms.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A wire heading mechanism for use in an automatic apparatus for producing headed wire forms including means for successively advancing a supply length of wire along a wire path to said wire heading mechanism, comprising a pair of axially telescoped rams, keyed for rotation in unison, and disposed for independent reciprocating axial movement at the end of said wire path, the outer ram of said pair having an end wire receiving bore closing about the end of said supply length of wire and presenting an encircling head forming die surface to said wire end, a ramming head forming die surface provided on an end of the inner ram operating within said wire receiving bore, and means operatively connected to said rams to selectively impart rotational and axial movements to said rams for causing said head forming die surfaces to mechanically work said wire end into a head configuration integral to the supply length of wire.

2. A wire heading mechanism for use in an automatic apparatus for producing headed wire forms including means for successively advancing a supply length of wire along a wire path to said wire heading mechanism, comprising support means located at the end of said wire path having a through bore in axial alignment with said wire path, a pair of axially telescoped rams, keyed for rotation in unison, rotatably mounted in said through bore, powering means for imparting rotational and independent axial reciprocating movement to said rams, the outer ram of said pair having an end wire receiving bore closing about the end of said supply length of wire and presenting an encircling head forming die surface to said wire end, a ramming head forming die surface provided on an end of the inner ram operating within said wire receiving bore, and actuating means operatively connected between said rams and said powering means for selectively imparting rotational and axial movement to said rams for causing said head forming die surfaces to mechanically work said wire end into a head configuration integral to the supply length of wire.

3. A wire heading mechanism as claimed in claim 2 wherein said powering means is operated in rotation and said actuating means includes cams imparted with said rotation and having selected cam profiles to produce movement of said rams in timed sequence according to a prescribed production cycle.

4. A wire heading mechanism for use in an automatic apparatus for producing headed wire forms including means for successively advancing a supply length of wire along a wire path to said wire heading mechanism, comprising support means located at the end of said wire path having a through bore in axial alignment with said wire path, a pair of axially telescoped rams, keyed for rotation in unison, rotatably mounted in said through bore, powering means for imparting rotational and independent axial reciprocating movement to said rams, a die block mounted in an end of the outer ram of said pair provided with a wire receiving bore adapted, during a power stroke of said outer ram, to close about the end of said supply length of wire and present an encircling head forming die surface to said wire end, a ramming head forming die surface provided on an end of the inner ram operating within said wire receiving bore, and actuating means operatively connected between said rams and said powering means for selectively imparting rotational and axial movement to said rams for causing said head forming die surfaces to mechanically work said wire end into a head configuration integral to the supply length of wire.

5. A wire heading mechanism for use in an automatic apparatus for producing headed wire forms including meanings for successively advancing a supply length of wire along a wire path to said wire heading mechanism, comprising support means located at the end of said wire path having a central axial through bore, the axis of which is in axial alignment with said wire path, bearing means mounted in said through bore, a first ram having a central through bore rotatably mounted in said bearing means, a second ram disposed within the through bore of said first ram, powering means for imparting rotational and independent axial reciprocating movement to said rams, a die block mounted in an end opening of the through bore of said first ram and having a central wire receiving through bore opening at one end to said second ram and adapted, during a power stroke of said first ram, to have the other end of said wire receiving bore close about the end of said supply length of wire and present an encircling head forming die surface to said wire end, a plunger provided on said second ram and extending into said wire receiving bore and presenting a ramming head forming die surface to said wire end, and actuating means operatively connected between said rams and said powering means for selectively imparting rotational and axial movement to said rams for causing said head forming die surfaces to mechanically work said wire end into a head configuration integral to the supply length of wire.

6. A wire heading mechanism for use in an automatic apparatus for producing headed wire forms including means for successively advancing a supply length of wire along a wire path to said wire heading mechanism, comprising support means located at the end of said wire path having a central axial through bore, the axis of which is in axial alignment with said wire path, bearing means mounted in said through bore, a first ram having a central through bore rotatably mounted in said bearing means, a second ram disposed within the through bore of said first ram, rotating powering means for imparting rotational and independent axial reciprocating movement to said rams, a die block mounted in an end opening of the through bore of said first ram and having a central wire receiving through bore opening at one end to said second ram and adapted, during a power stroke of said first ram, to have the other end of said wire receiving bore close about the end of said supply length of wire and present an encircling head forming die surface to said wire, a plunger provided on said second ram and extending into said wire receiving bore and presenting a ramming head forming die surface to said wire end, and actuating means operatively connected between said rams and said rotating powering means for selectively imparting rotational and axial movement to said rams for causing said head forming die surfaces to mechanically work said wire end, said actuating means including cams having selected cam profiles to produce movement of said rams in timed sequence according to a prescribed production cycle.

7. An automatic apparatus for producing headed wire forms including a wire feeding mechanism for successively advancing a supply length of wire along a wire path, a wire cutting mechanism located near the end of said wire path and on opposite sides thereof and adapted to sever said supply length of wire in a lateral shearing movement across said wire path, a wire clamping mechanism located at the end of said wire path and adapted to secure said supply length of wire against movement in a lateral closing movement on said wire, a wire heading mechanism including a pair of axially telescoped rams, keyed for rotation in unison, and disposed for independent reciprocating axial movement at the end of said wire path, the outer ram of said pair having an end wire receiving bore closing against said wire clamping mechanism and about the end of said supply length of wire and presenting an encircling head forming die surface to said wire end, a ramming head forming die surface provided on an end of the inner ram operating within said wire receiving bore, rotating powering means for imparting movement to said mechanisms, and actuating means operatively connected between said rotating powering means and said mechanisms and including cams having selected cam profiles to produce movement of said mechanisms in timed sequence according to a prescribed production cycle.

8. An automatic apparatus for producing headed wire forms including a wire feeding mechanism for successively advancing a supply length of wire along a wire path, a wire cutting mechanism located near the end of said wire path and on opposite sides thereof and adapted to sever said supply length of wire in a lateral shearing movement across said wire path, a wire clamping mechanism located at the end of said wire path and adapted to secure said supply length of wire against movement in a lateral closing movement on said wire, a wire heading mechanism including support means located at the end of said wire path having a central axial through bore, the axis of which is in axial alignment with said wire path, bearing means mounted in said through bore, a first ram having a central through bore rotatably mounted in said bearing means, a second ram disposed within the through bore of said first ram, a die block mounted in an end opening of the through bore of said first ram and having a central wire receiving through bore opening at one end to said second ram and adapted, during a power stroke of said first ram, to have the other end of said wire receiving bore close against said wire clamping mechanism and about the end of said supply length of wire and presenting an encircling head forming die surface to said wire end, a plunger provided on said second ram and extending into said wire receiving bore and presenting a ramming head forming die surface to said wire end, rotating powering means for imparting movement to said mechanisms, and actuating means operatively connected between said rotating powering means and said mechanisms and including cams having selected cam profiles to produce movement of said mechanisms in timed sequence according to a prescribed production cycle.

9. A wire heading apparatus as claimed in claim 8 wherein said wire feeding mechanism includes a fixed guide means located along one side of said wire path, a laterally movable guide means located on the other side of said wire path opposite said fixed guide means, a feeder head disposed for axial reciprocating movement along said wire path in the clearance between said guide means, interposing spring means normally biasing said feeder head out of engagement with the supply length of wire along said wire path, and means operatively connected to impart an axial feeding thrust movement to said feeder head simultaneously with lateral wire engaging movement through said movable guide to cause said feeder head to advance said wire along said wire path.

10. An apparatus for producing headed wire forms including a bench support, wire handling and wire heading mechanisms mounted on said support, rotating powering shafts mounted on said support about said mechanisms, said wire handling mechanisms including a wire feeding mechanism located at the origin of a prescribed wire path and effective to feed successive lengths of a supply length of wire disposed along said prescribed wire path in axial reciprocating movement along said wire path, a wire cutting mechanism located near the end of said wire path and on opposite sides thereof and effective to cut said supply length of wire in lateral shearing movement across said wire path, and a wire clamping mechanism located at the end of said wire path and on opposite sides thereof and effective to secure the supply length of wire against movement in lateral closing movement on said wire path, said wire heading mechanism comprising a support means located at the end of said wire path having a central through bore, a pair of axially telescoped rams, keyed for rotation in unison, mounted for rotation and axial independent reciprocating movement in said support means, head forming die surfaces provided on an end of said rams and effective to mechanically work an end of said wire into a head configuration integral to said supply length of wire in axial ram movement into said wire path simultaneous with selective ram rotation, and actuating means operatively connected between said powering shafts and said mechanisms to impart said lateral, axial, and selective rotational movement to said mechanisms for producing a headed wire form each revolution of said powering shafts, said actuating means including cams indexed to a prescribed production cycle and having selected profiles for producing said movements in timed sequence according to said production cycle.

11. An apparatus for producing headed wire forms including a bench support, wire handling and wire heading mechanisms mounted on said support, rotating powering shafts mounted on said support about said mechanisms, said wire handling mechanisms including a wire feeding mechanism located at the origin of a prescribed wire path comprising a stationary guide member located along one side of said wire path, a laterally movable guide member located along the other side of said wire path opposite said stationary guide member, and a feeder head operatively disposed on a supply length of wire along said wire path between said guide members and effective to engage said wire on lateral movement of said movable guide member against said feeder head and to feed successive lengths of said engaged supply length of wire along said wire path in axial reciprocating movement along said wire path, a wire cutting mechanism located near the end of said wire path and on opposite sides thereof and effective to cut said supply length of wire in lateral shearing movement across said wire path, and a wire clamping mechanism located at the end of said wire path and on opposite sides thereof and effective to secure the supply length of wire against movement in lateral closing movement on said wire path, said wire heading mechanism comprising a support means located at the end of said wire path having a central through bore, a pair of axially telescoped rams, keyed for rotation in unison, mounted for rotation and axial independent reciprocating movement in said support means, head forming die surfaces provided on an end of said rams and effective to mechanically work an end of said wire into a head configuration integral to said supply length of wire in axial ram movement into said wire path simultaneous with selective ram rotation, and actuating means operatively connected between said powering shafts and said mechanisms to impart said lateral, axial, and selective rotational movement to said mechanisms for producing a headed wire form each revolution of said powering shafts, said actuating means including cams indexed to a prescribed production cycle and having selected profiles for producing said movements in timed sequence according to said production cycle.

12. An apparatus for producing headed wire forms including a bench support, wire handling and wire heading mechanisms mounted on said support, rotating powering shafts mounted on said support about said mechanisms, said wire handling mechanisms including a wire feeding mechanism located at the origin of a prescribed wire path comprising a stationary guide member located along one side of said wire path, a laterally movable guide member located along the other side of said wire path opposite said stationary guide member, and a feeder head operatively disposed on a supply length of wire along said wire path between said guide members and effective to engage said wire on lateral movement of said movable guide member against said feeder head and to feed successive lengths of said engaged supply length of wire along said wire path in axial reciprocating movement along said wire path, a wire cutting mechanism located near the end of said wire path and on opposite sides thereof comprising a laterally movable knife and a laterally movable guide member having a through bore through which the supply length of wire is disposed, said wire cutting mechanism being effective to cut said supply length of wire in lateral movement of said knife up to said wire path and lateral shearing movement of said guide member across said wire path, and a wire clamping mechanism located at the end of said wire path and on opposite sides thereof and effective to secure the supply length of wire against movement in lateral closing movement on said wire path, said wire heading mechanism comprising a support means located at the end of said wire path having a central through bore, a pair of axially telescoped rams, keyed for rotation in unison, mounted for rotation and axial independent reciprocating movement in said support means, head forming die surfaces provided on an end of said rams and effective to mechanically work an end of said wire into a head configuration integral to said supply length of wire in axial ram movement into said wire path simultaneous with selective ram rotation, and actuating means operatively connected between said powering shafts and said mechanisms to impart said lateral, axial, and selective rotational movement to said mechanisms for producing a headed wire form each revolution of said powering shafts, said actuating means including cams indexed to a prescribed production cycle and having selected profiles for producing said movements in timed sequence according to said production cycle.

13. An apparatus for producing headed wire forms including a bench support, wire handling and wire heading mechanisms mounted on said support, rotating powering shafts mounted on said support about said mechanisms, said wire handling mechanisms including a wire feeding mechanism located at the origin of a prescribed wire path comprising a stationary guide member located along one side of said wire path, a laterally movable guide member located along the other side of said wire path opposite said stationary guide member, and a feeder head operatively disposed on a supply length of wire along said wire path between said guide members and effective to engage said wire on lateral movement of said movable guide member against said feeder head and to feed successive lengths of said engaged supply length of wire along said wire path in axial reciprocating movement along said wire path, a wire cutting mechanism located near the end of said wire path and on opposite sides thereof comprising a laterally movable knife and a laterally movable guide member having a through bore through which the supply length of wire is disposed, said wire cutting mechanism being effective to cut said supply length of wire in lateral movement of said knife up to said wire path and lateral shearing movement of said guide member across said wire path, and a wire clamping mechanism located at the end of said wire path and on opposite sides thereof and effective to secure the supply length of wire against movement in lateral closing movement on said wire path, said wire heading mechanism comprising a support means located at the end of said wire path having a central through bore, a pair of axially telescoped rams, keyed for rotation in unison, mounted for rotation and independent axial reciprocating movement in said support means, a die block mounted in an end of the outer ram of said pair provided with a wire receiving bore adapted, during a power stroke of said outer ram, to close against said wire clamping mechanism about the end of said supply length of wire and present an encircling head forming die surface to said wire end, a ramming head forming die surface provided on an end of the inner ram operating within said wire receiving bore, said head forming die surfaces being effective to mechanically work said wire end into a head configuration integral to said supply length of wire in axial ram movement into said wire path simultaneous with selective ram rotation, and actuating means operatively connected between said powering shafts and said mechanisms to impart said lateral, axial, and selective rotational movement to said mechanisms for producing a headed wire form each revolution of said powering shafts, said actuating means including cams indexed to a prescribed production cycle and having selected profiles for producing said movements in timed sequence according to said production cycle.

14. An apparatus for producing headed wire forms including a bench support, wire handling and wire heading mechanisms mounted on said support, rotating powering shafts mounted on said support about said mechanisms, said wire handling mechanisms including a wire feeding mechanism located at the origin of a prescribed wire path comprising a stationary guide member located along one side of said wire path, a laterally movable guide member located along the other side of said wire path opposite said stationary guide member, and a feeder head operatively disposed on a supply length of wire along said wire path between said guide members and effective to engage said wire on lateral movement of said movable guide member against said feeder head and to feed successive lengths of said engaged supply length of wire along said wire path in axial reciprocating movement along said wire path, a wire cutting mechanism located near the end of said wire path and on opposite sides thereof comprising a laterally movable knife and a laterally movable guide member having a through bore through which the supply length of wire is disposed, said wire cutting mechanism being effective to cut said supply length of wire in lateral movement of said knife up to said wire path and lateral shearing movement of said guide member across said wire path, and a wire clamping mechanism located at the end of said wire path and on opposite sides thereof and effective to secure the supply length of wire against movement in lateral closing movement on said wire path, said wire heading mechanism comprising a support means located at the end of said wire path having a central through bore in axial alignment with said wire path, a first ram having a central through bore rotatably mounted in said support means, a second ram disposed within the through bore of said first ram, said rams being keyed for rotation in unison and independent axial reciprocating movement, a die block mounted in an end opening of the through bore of said first ram and having a central wire receiving through bore opening at one end to said second ram and adapted, during a power stroke of said first ram, to have the other end of said wire receiving bore close against said wire clamping mechanism about the end of said supply length of wire and present an encircling head forming die surface to said wire end, a plunger provided on said second ram extending into said wire receiving bore and presenting a ramming head forming die surface to said wire end, said head forming die surfaces being effective to mechanically work said wire end into a head configuration integral to said supply length of wire in axial ram movement into said wire path simultaneous with selective ram rotation, and actuating means operatively connected between said powering shafts and said mechanisms to impart said lateral, axial, and selective rotational movement to said mechanisms for producing a head wire form each revolution of said powering shafts, said actuating means including cams indexed to a prescribed production cycle and having selected profiles for producing said movements in timed sequence according to said production cycle.

No references cited.

WILLIAM W. DYER, JR., *Primary Examiner.*